(12) United States Patent
Unno

(10) Patent No.: US 10,333,391 B2
(45) Date of Patent: Jun. 25, 2019

(54) CONTROL METHOD OF HIGH EFFICIENT BUCK-BOOST SWITCHING REGULATOR

(71) Applicant: Dialog Semiconductor GmbH, Kirchheim/Teck-Nabern (DE)

(72) Inventor: Naoyuki Unno, Kawasaki (JP)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 289 days.

(21) Appl. No.: 13/847,574

(22) Filed: Mar. 20, 2013

(65) Prior Publication Data
US 2014/0266085 A1    Sep. 18, 2014

(30) Foreign Application Priority Data
Mar. 15, 2013  (EP) ..................... 13368010

(51) Int. Cl.
*H02M 3/04*    (2006.01)
*H02M 3/156*   (2006.01)
(Continued)

(52) U.S. Cl.
CPC ............ *H02M 3/04* (2013.01); *H02M 3/156* (2013.01); *H02M 3/1582* (2013.01); *H02M 2001/0025* (2013.01)

(58) Field of Classification Search
CPC . H02M 2003/1552; H02M 2003/1582; H02M 2003/1584; H02M 3/1582; H02M 3/1584; H02M 3/04; G05F 1/24
(Continued)

(56) References Cited

U.S. PATENT DOCUMENTS 6,166,527 A * 12/2000 Dwelley et al. .............. 323/282
7,881,144 B1 * 2/2011 Maung et al. ................ 365/226
(Continued)

FOREIGN PATENT DOCUMENTS

EP    2 378 649       10/2011
JP    2005 045943     2/2005

OTHER PUBLICATIONS

European Search Report 13368010.8-1804 dated Oct. 24, 2013, Dialog Semiconductor GmbH.
(Continued)

*Primary Examiner* — Jeffrey A Gblende
*Assistant Examiner* — Lorena D Bruner
(74) *Attorney, Agent, or Firm* — Saile Ackerman LLC; Stephen B. Ackerman

(57) ABSTRACT

The present disclosure relates to methods and circuits to achieve a buck-boost switching regulator that allows changing operation modes without causing large output ripples during transition of operation modes Increased error amplifier output voltage range over which the converter stays in its present operating mode (buck or boost or buck-boost), resulting in hysteresis between error amplifier output voltage and output voltage). The larger the hysteresis, the smaller will be the likeliness of having to switch between modes. A first embodiment is combining masking logic applied to signals driving the switches of the switching regulator and offset feedback to outputs of the error amplifier in order to providing hysteresis to suppress operation mode bounce and to minimize ripples while a second embodiment is monitoring pulse width of PWM pulses by a pulse width checker.

15 Claims, 6 Drawing Sheets

(51) Int. Cl.
    *H02M 3/158*     (2006.01)
    *H02M 1/00*      (2006.01)
(58) Field of Classification Search
    USPC ............... 323/234, 299, 242, 243, 271, 288
    See application file for complete search history.

(56) References Cited

U.S. PATENT DOCUMENTS

| | | | |
|---|---|---|---|
| 7,994,762 B2* | 8/2011 | de Cremoux et al. | 323/271 |
| 8,330,435 B2 | 12/2012 | Qiu et al. | |
| 8,860,387 B2* | 10/2014 | Kobayashi | H02M 3/1582 |
| | | | 323/259 |
| 2006/0055384 A1 | 3/2006 | Jordan et al. | |
| 2011/0006743 A1* | 1/2011 | Fabbro | H02M 3/1582 |
| | | | 323/282 |
| 2011/0043172 A1 | 2/2011 | Deam | |
| 2012/0032658 A1 | 2/2012 | Casey et al. | |
| 2012/0146594 A1* | 6/2012 | Kobayashi | 323/234 |
| 2012/0229110 A1 | 9/2012 | Huang et al. | |
| 2014/0333276 A1* | 11/2014 | Arno | H02M 3/33569 |
| | | | 323/282 |

OTHER PUBLICATIONS

"Σ-Δ Modulated Digitally Controlled Non-Inverting Buck-Boost Converter for WCDMA RF Power Amplifiers," by Rajarshi Paul et al., Applied Power Electronics Conference and Exposition, 2009. APEC 2009. Twenty-Fourth Annual IEEE, Feb. 2009, pp. 533-539.

* cited by examiner

→ Mode bounce

Boost      Buck-boost

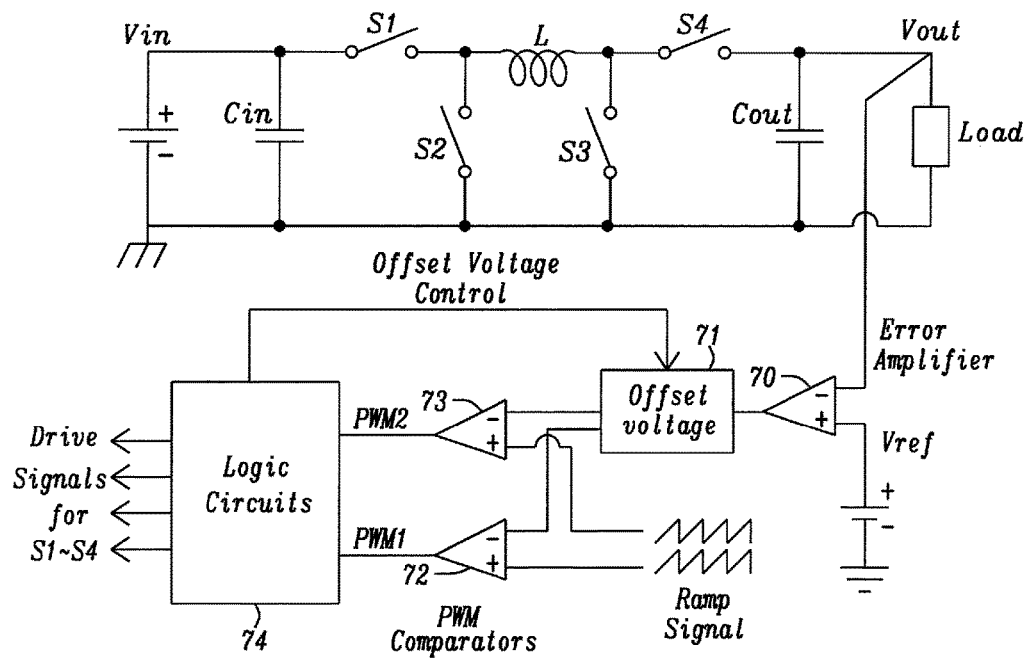
FIG. 7 – Prior Art
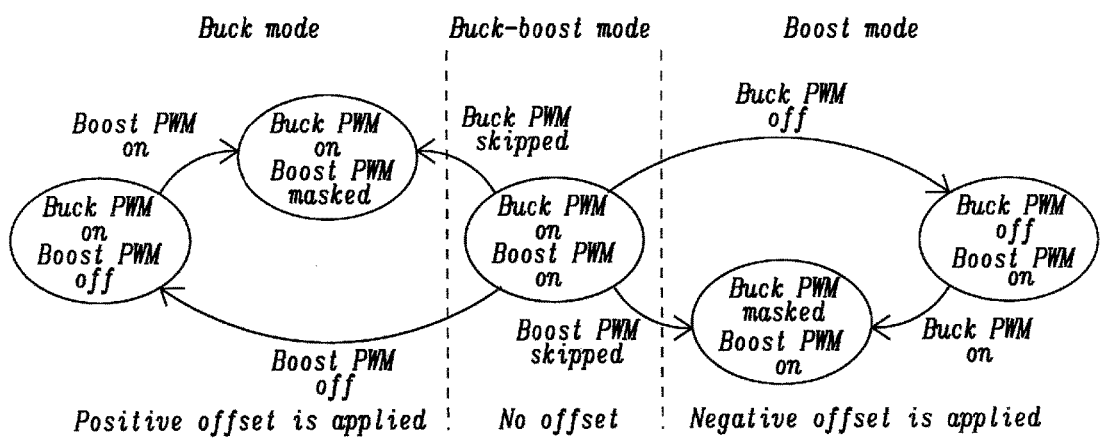
FIG. 8

CONTROL METHOD OF HIGH EFFICIENT BUCK-BOOST SWITCHING REGULATOR

TECHNICAL FIELD

The present document relates to DC-to-DC converters. In particular, the present document relates to control methods of buck-boost switching regulators and related circuits which can regulate output voltage at higher and lower voltage than the input voltage.

BACKGROUND

The classical buck-boost control uses only one PWM control signal and employs only 1 operation mode. It suffers poor conversion efficiency due to its high switch driving loss and high inductor current requirement.

A recent buck-boost converter employs different operation modes, and use more than one PWM control signal. Patent (U.S. Pat. No. 6,166,527 to Dwelley et al.) describes 3 mode operations comprising a buck, a buck-boost and a boost mode. This improves the efficiency, but it still has efficiency issue in the buck-boost mode. In this mode, all four switches have to work, and driving loss of switches is still high, and reduces the efficiency at light load condition.

Another recent buck-boost converter (US Patent Publication 2012/0146594 A1 to Kobayashi) employs 5 operation modes, which have a buck, a half-frequency buck, a half-frequency buck-boost, a half-frequency-boost, and a boost mode, and has ability to reduce the switching frequency in half. This improves the efficiency when input voltage is close to the output voltage while it maintains regulation performance.

These buck-boost converters using different operation modes might have a mode bounce issue which occurs at the transition of two operation modes. If the mode bounce occurs, the converter goes back and forth between two operation modes and looks unstable as shown in FIG. 1 prior art. FIG. 1 prior art shows from top down a signal at LX1 node, a signal at LX2 node and an inductor current. The switching nodes LX1 and LX2 are located at a first and a second terminal of the inductor as shown in FIG. 5. As a result, starting with an operation mode change, the output voltage suffers from significant ripples and the efficiency is degraded. To avoid the mode bounce, there needs a large offset voltage on the error amplifier output as shown in FIG. 3a prior art when the operation mode changes and it causes a large output ripple during the transition. FIG. 2 prior art shows from top down the signal at LX1 node, the signal at LX2 node, the output voltage, and an inductor current when a mode change occurs.

FIG. 5 prior art shows a prior art buck-boost switching configuration having 4 switches S1-S4. According to the switching state, this can be a buck topology having two switches S1-S2 as shown in FIG. 6a prior art or a boost topology having two switches S3-S4 as shown in FIG. 6b prior art.

It is a challenge for the designers of buck-boost switching regulators to suppress operation mode bounce and minimize ripples/glitch when an operation mode change is required.

SUMMARY

A principal object of the present disclosure is to ensure that changing operation modes doesn't cause large output ripples during and after transition.

Another principal object of the present disclosure is to reduce the need to switch operation modes and improve the efficiency in such conditions.

A further object of the disclosure is to avoid miss-triggering of switching between modes (increasing the robustness of the system).

A further object of the disclosure is to implement increased error amplifier output voltage range over which the converter stays in its present operating mode (buck or boost or buck-boost), resulting in hysteresis between error amplifier output voltage and output voltage. The larger the hysteresis, the smaller will be the likeliness of having to switch between modes.

A further object of the disclosure is to minimize the mode bounce by staying in a current mode as long as possible. It results in hysteresis where the mode change occurs.

A further object of the disclosure is to reduce switching losses and ripple resulting from mode changes by reducing mode bounce.

A further object of the disclosure is to reduce the output ripple during the mode transition by:
 Reducing the offset by shifting the buck to buck-boost transition to larger and the boost to buck-boost transition to smaller error amplifier output voltages, and
 Reducing the likeliness to switch modes by staying longer within one mode by shifting the transition point from boost to buck-boost to smaller and from buck to buck-boost to larger error amplifier voltages.

A further object of the disclosure is to make the converter more tolerant for the switching noise injection to the error amplifier output.

In accordance with the objects of this disclosure a method to suppress operation mode bounce of a buck-boost switching regulator and have low ripple/glitch when a mode change is required has been disclosed. The method disclosed comprises the steps of: providing the buck-boost switching regulator comprising an error amplifier, PWM pulse generators, and logic circuits driving switches of the buck-boost regulator, and combining masking logic applied to signals driving the switches of the switching regulator and offset feedback to outputs of the error amplifier in order to providing hysteresis to suppress operation mode bounce by staying in an actual mode as long as possible and to minimize ripples when a change of an operation mode is required.

In accordance with the objects of this disclosure a method to suppress operation mode bounce of a buck-boost switching regulator and have low ripple/glitch when a mode change is required has been disclosed. The method disclosed comprises the steps of: providing the buck-boost switching regulator comprising an error amplifier, PWM pulse generators, offset voltage control, and logic circuits driving switches of the buck-boost regulator and reducing the offset voltage by shifting a buck to buck-boost transition to larger and the boost to buck-boost transition to smaller error amplifier output voltages, wherein until a mode transition is performed, an offset voltage is added to an output of the error amplifier via the offset voltage control so that undesired PWM pulse is not generated.

In accordance with the objects of this disclosure a method to suppress operation mode bounce of a buck-boost switching regulator and have low ripple/glitch when a mode change is required has been disclosed. The method disclosed comprises the steps of: providing a buck-boost switching regulator comprising an error amplifier, PWM pulse generators, a pulse width checker, and logic circuits driving switches of the buck-boost regulator, and combining state control of mode transition by monitoring pulse width of PWM pulses generated by the PWM pulse generators by the pulse width checker and offset feedback to outputs of the error amplifier in order to providing hysteresis to suppress operation mode bounce and to minimize ripples when a change of an operation mode is required, wherein the monitoring results are provided by the pulse-width checker to the logic circuits driving the switches.

In accordance with the objects of this disclosure a buck-boost switching regulator configured to suppress operation mode bounce having low ripple/glitch when a mode change is required has been disclosed. The buck-boost switching regulator firstly comprises: an error amplifier having inputs and an output, wherein a first input is an output voltage of the regulator, a second input is a reference voltage, and the output is an input of an offset voltage block, said offset voltage block enlarging an output voltage range of the error having an input and outputs wherein the input is an output from a masking logic block or an output from a logic circuit block and a first output is a first input to a first PWM pulse generator and a second output is a first input of a second PWM pulse generator, the first PWM generator receiving ramp signals as second input and providing buck PWM signals to the logic circuit block, and the second PWM generator receiving ramp signals as second input and providing boost PWM signals to a logic circuit block. Furthermore the buck-boost switching regulator disclosed comprises said logic circuit block generating signals driving switches of the switching regulator providing output to a masking logic block, and said masking logic block configured to support operation mode transitions by masking PWM pulses and skipping PWM pulses in order to provide hysteresis in order to reduce ac number of operation mode transitions.

In accordance with the objects of this disclosure a buck-boost switching regulator configured to suppress operation mode bounce having low ripple/glitch when a mode change is required has been disclosed. The buck-boost switching regulator firstly comprises: an error amplifier having inputs and an output, wherein a first input is an output voltage of the regulator, a second input is a reference voltage, and the output is an input of an offset voltage block, said offset voltage block enlarging an output voltage range of the error having an input and outputs wherein the input is an output from a logic circuit block and a first output is a first input to a first PWM pulse generator and a second output is a first input of a second PWM pulse generator, the first PWM generator receiving ramp signals as second input and providing PWM signals to a pulse width checker and to the logic circuit block, and the second PWM generator receiving ramp signals as second input and providing PWM signals to a pulse width checker and to the logic circuit block. Furthermore the buck-boost switching regulator disclosed comprises said pulse width checker configured to perform state control by monitoring pulse width of the PWM pulses generated by said first and second PWM generators, wherein the output of the pulse width checker is an input of said logic circuit block and said logic circuit block generating signals driving switches of the switching regulator providing output to a masking logic block and providing offset voltage to the offset voltage block.

BRIEF DESCRIPTION OF THE FIGURES

The invention is explained below in an exemplary manner with reference to the accompanying drawings, wherein FIG. 1 prior art illustrates a plot of an operation mode bounce between boost and buck-boost.

FIG. 7 prior art depicts a prior-art control method of a buck-boost regulator.

FIG. 8 illustrates state transition diagrams for transitions between buck, buck-boost, and boost operation modes according to one embodiment of the present disclosure.

DETAILED DESCRIPTION

Methods and circuits to minimize the operation mode bounce by staying in one operation mode as long as possible are disclosed. It results in hysteresis when operation mode change is about to occur.

An essential feature of the disclosure is increased error amplifier output voltage range over which the converter stays in its present operating mode (buck or boost or buck-boost), resulting in hysteresis between error amplifier output voltage and output voltage). The larger the hysteresis, the smaller will be the likeliness of having to switch between modes.

Figure 1:
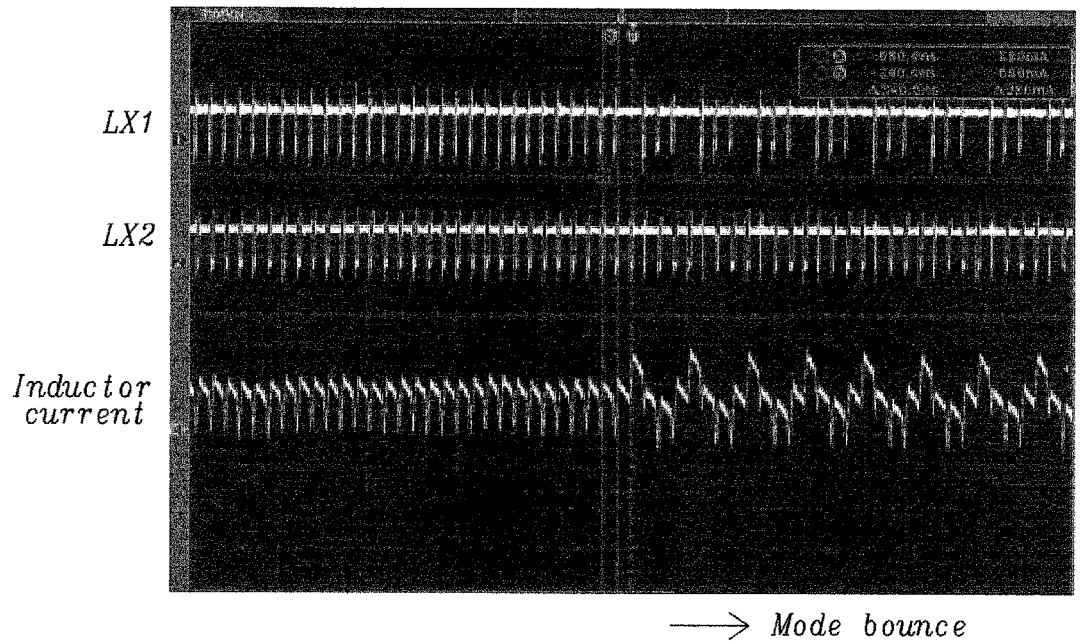
Figure 2:
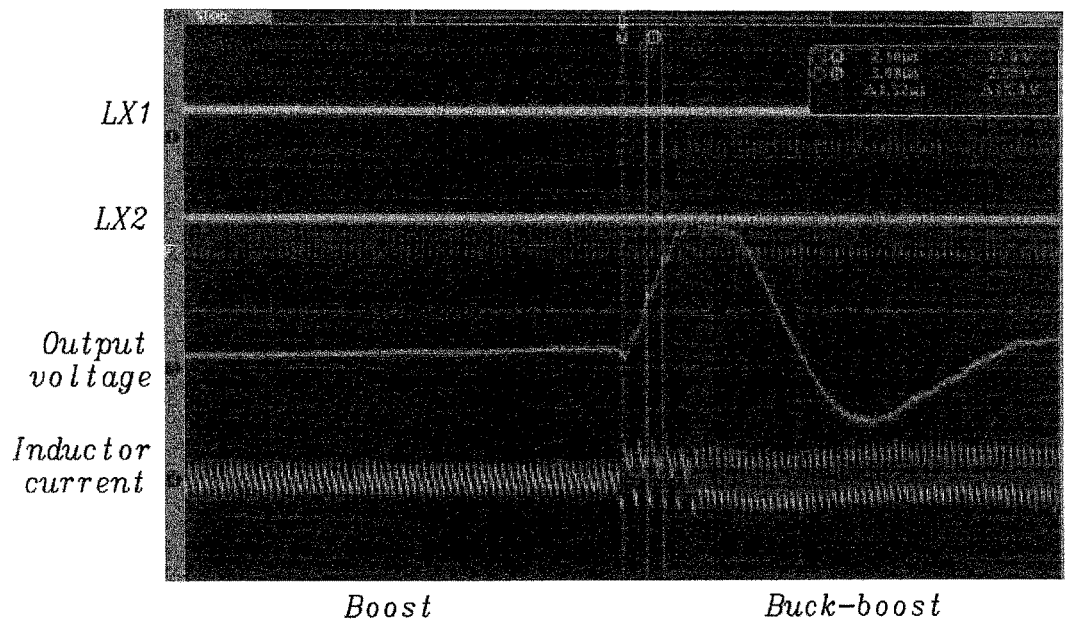
FIG. 2 prior art shows output ripple during an operation mode transition.
Figure 3A:
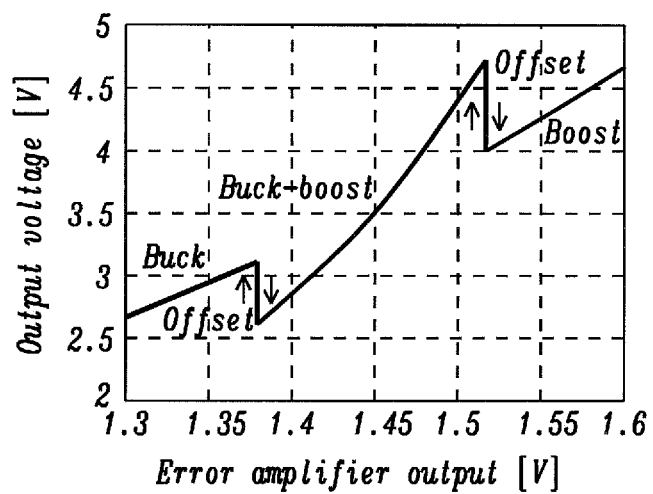
FIG. 3a prior art shows the behavior of buck, buck-boost and boost transitions of prior art.

FIG. 3a prior art and 3b compare the behavior of buck, buck-boost and boost mode transitions of a buck-boost regulator of prior art (FIG. 3a prior art) and of an improved converter (FIG. 3b) of the present disclosure by illustrating output voltage versus error amplifier output voltage in transitions from buck to buck-boost and to boost operation mode.

Figure 3B:
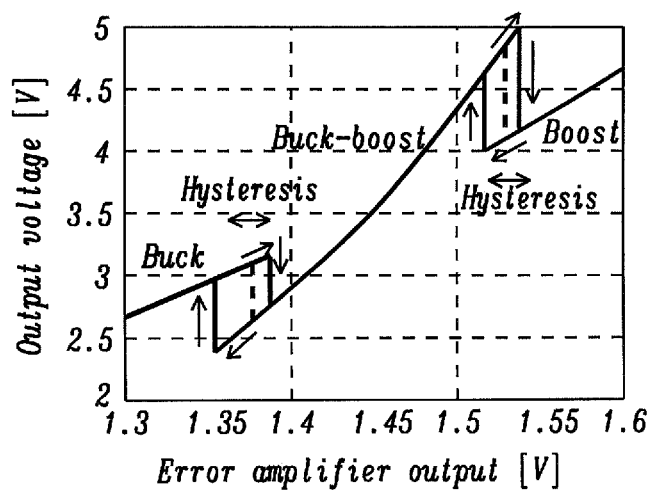
FIG. 3b shows the behavior of buck, buck-boost and boost transitions of the present disclosure.

The buck-boost converter disclosed minimizes the mode bounce by staying in an actual mode as long as possible as shown in FIG. 3b. It results in strong hysteretic operation of mode changes. Furthermore the offset of the output voltage is reduced by shifting the buck to buck-boost transition to larger and the boost to buck-boost transition to smaller error amplifier voltages.

The offset from buck-boost to boost looks higher in FIG. 3b. However, it can be small by shifting the buck-boost to boost transition to smaller error amplifier voltage as long as the mode bounce is suppressed.

It should be noted that the likeliness to switch operation modes by staying longer within one mode by shifting the transition point from boost to buck-boost to smaller and from buck to buck-boost to higher error amplifier voltages.

If larger ripples can be tolerated, one may also shift the transition point from buck-boost to buck to smaller and the transition point from buck-boost to boost to larger error amplifier outputs.

Figure 4A:
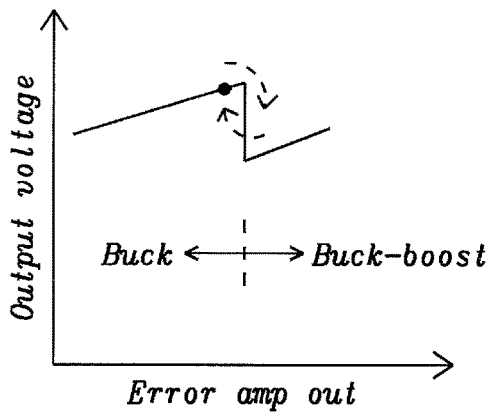
FIG. 4a prior art shows noise influence on the operation mode.
Figure 4B:
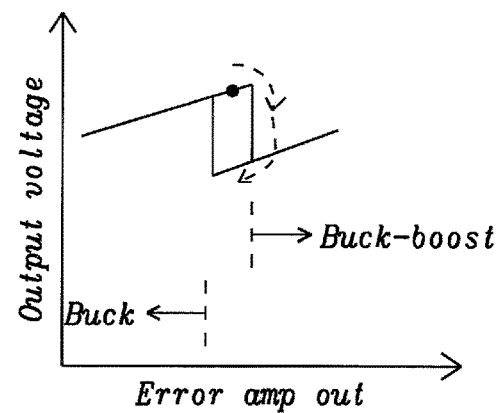
FIG. 4b shows noise influence on the operation mode with a regulator of the present disclosure.
Figure 5:
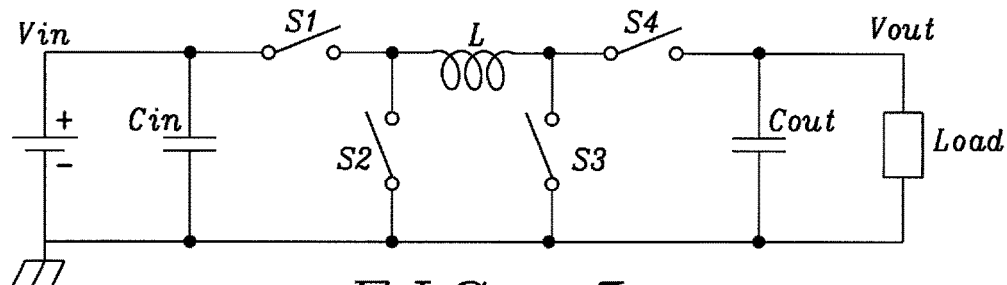
FIG. 5 prior art shows a prior art buck-boost switching configuration.
Figure 6A:
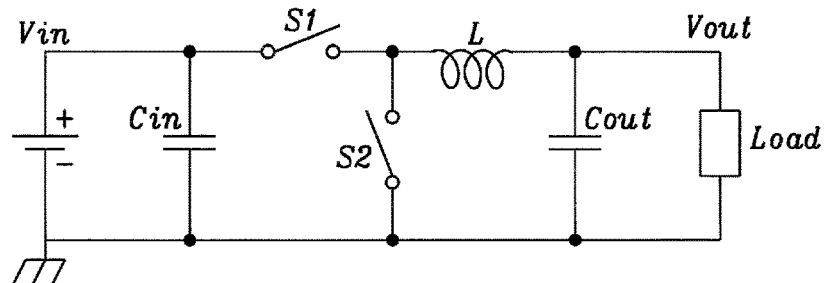
FIG. 6a prior art shows a buck switching configuration.
Figure 6B:
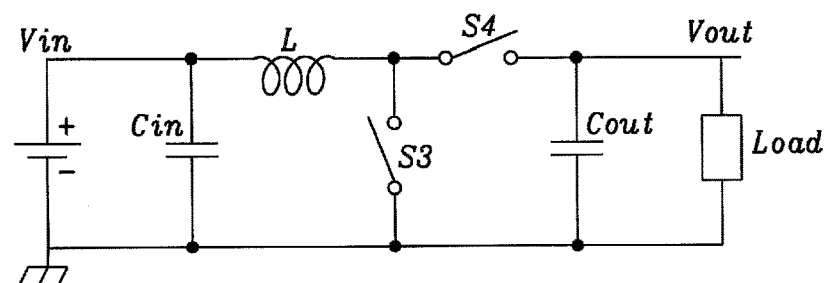
FIG. 6b prior art shows a boost switching configuration.

The converter disclosed is more tolerant for the switching noise injection to the error amplifier output compared to prior art. FIG. 4a prior art shows noise influence on the operation mode. As shown in FIG. 4 prior art the noise injection mis-triggers the mode change, and the mode changes back to the correct one. FIG. 4b shows noise influence on the operation mode with a regulator of the present disclosure. If the mode change is mis-triggered the converter disclosed keeps operating in the next mode and the mode bounce does not occur as shown in FIG. 4a prior art.

FIG. 7 prior art depicts a prior-art control method of a buck-boost regulator. The error amplifier 70 compares the output voltage Vout and the reference voltage Vref, and offset voltage is added by an offset voltage control block 71 on the error amplifier output. The PWM comparators 71 and 72 generate PWM signals for buck and boost by comparing the error amplifier output and the ramp signals. The logic circuit block 74 controls the offset voltage addition and drives signals for the four switches S1-S4.

It should be noted that in the present disclosure the transition points, compared to prior art, are significantly different according to which mode to which mode a transition is performed and it results in hysteresis on the error amplifier output.

Figure 9:
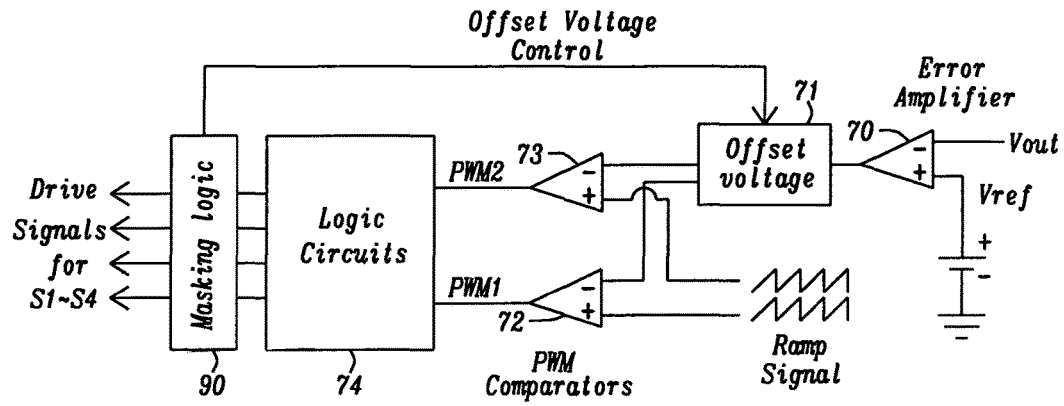
FIG. 9 illustrates a block diagram of a buck-boost regulator of a preferred embodiment of the present disclosure

FIG. 9 illustrates a block diagram of a preferred embodiment of the present disclosure. A masking logic block 90, which masks the boost PWM pulses from the logic circuit block 74 in the buck mode and the buck PWM pulses from the logic circuit block 74 in the boost mode until the mode change to the buck-boost occurs. The masking logic block 90 is a key feature of the buck-boost regulator of the present disclosure. The logic circuit block 74 also provides the offset voltage for the offset voltage block 71 biasing the output of the error amplifier 70. The PWM1 and PWM2 generators are dedicated to generating buck or boost pulses, one PWM generator is for buck and the other PWM generator is for boost.

The offset voltage control signals could alternatively be provided by the logic circuits 74 of FIG. 9 instead of the masking logic block 90.

FIG. 8 illustrates state transition diagrams for transitions between buck, buck-boost, and boost operation modes according to one embodiment of the present disclosure as shown in FIG. 9. In this embodiment the boost PWM pulses are masked in the buck mode and the buck PWM pulses are masked in the boost mode until the mode change to the buck-boost occurs.

For example, the mode change is triggered according to FIG. 8 as follows:
Transition from buck to buck-boost mode is performed by:
Masking the boost PWM pulse until the buck PWM pulse is skipped in the buck mode.
Transition from buck-boost to buck mode is performed by:
Skipping the boost PWM pulse in the buck-boost mode
Transition from buck-boost to boost mode is performed by:
Skipping the buck PWM pulse in the buck-boost mode
Transition from boost to buck-boost mode is performed by:
Masking the buck PWM pulse is masked until the boost PWM pulse is skipped in the boost mode.

Figure 10:
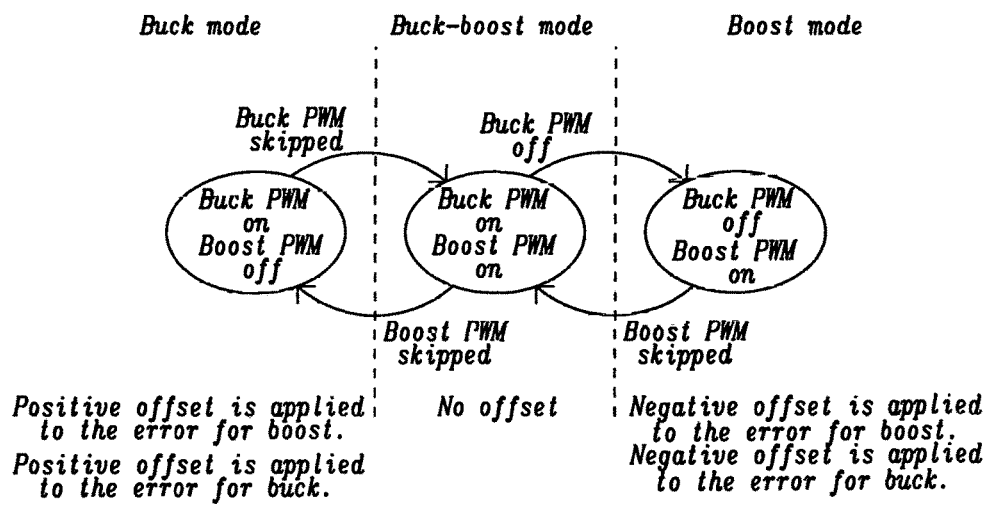
FIG. 10 shows a state transition diagram of the present disclosure.
Figure 11:
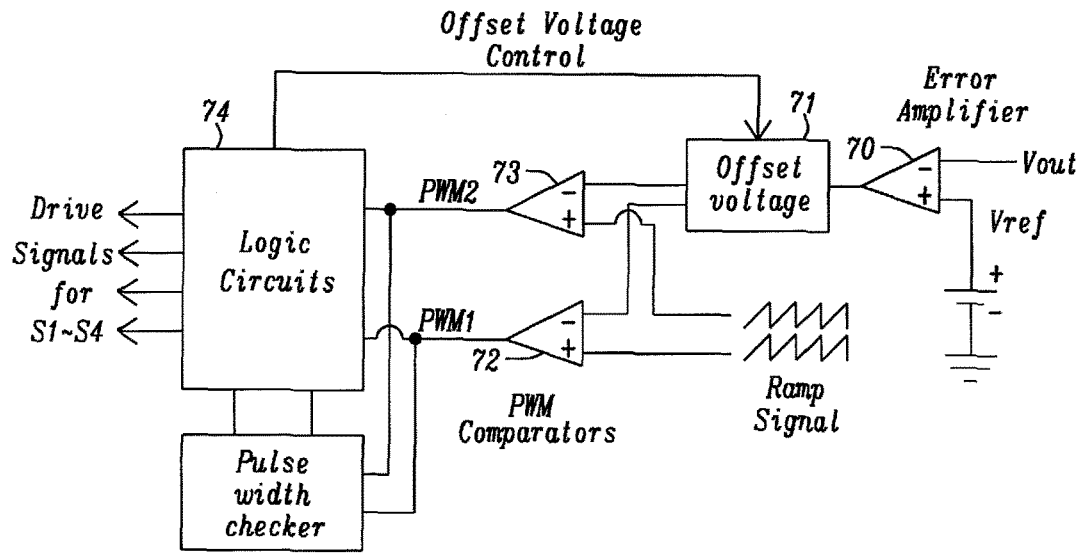
FIG. 11 depicts a buck-boost comprising a pulse width checker which outputs are used to decide the switching state of the regulator.

Another embodiment of the disclosure is an offset voltage control as shown in FIG. 10. In summary, the offset voltage is reduced by shifting the buck to buck-boost transition to larger and the boost to buck-boost transition to smaller error amplifier output voltages.

Until a mode transition is performed, as shown in FIG. 9, an offset voltage is added to the output of error amplifier 70 via the offset voltage block 71 so that the undesired PWM pulse is not generated.

For example,
1. Transition from buck to buck-boost mode: The mode change occurs when the buck PWM pulse is skipped in the buck mode. Until that, a negative offset voltage is added to the error amplifier output for the boost PWM comparator so that the boost PMW is not generated. Once the mode transition actually starts, the offset is removed and the boost PWM starts to be generated.
2. Transition from boost to buck-boost mode: The mode change occurs when the boost PWM pulse is skipped in the boost mode. Until that, a positive offset voltage is added on the error amplifier output for the buck PWM comparator so that the buck PMW is not generated. Once the mode transition starts, the offset is removed and the buck PWM starts to be generated.

In the buck-boost mode no offset voltage is applied.

It should be noted that the transition points are reached when a buck/boost PWM pulse is naturally skipped when predefined transition points are reached by the control loop.

The state transition diagram of FIG. 10 shows that, in case the regulator is in buck mode, in order to delay a transition to buck-boost mode a negative offset voltage is applied to the output of the error amplifier 71 to mask boost pulses. In order to delay a transition from buck-boost mode to buck mode a positive offset voltage is applied to the output of the error amplifier 71 to mask buck pulses.

Furthermore, in case the regulator is in boost mode, in order to delay a transition to buck-boost mode a negative offset voltage is applied to the output of the error amplifier 71 to mask boost pulses. In order to delay a transition from buck-boost mode to buck mode a positive offset voltage is applied to the output of the error amplifier 71 to mask buck pulses.

Another embodiment of the disclosure is a state control by monitoring the pulse width instead of masking pulses when a transition might be required. The mode change threshold is given by the PWM pulse width, and the switching state is controlled by the logic circuits depending on the PWM pulse width, which are outputs of the pulse width checker 110 as shown in FIG.

The pulse width checker 110 defines the transition points. When the PWM pulse width crosses the transition point, the mode change is triggered. The hysteresis can be implemented by having different pulse widths that trigger the transition. Once the mode change is triggered, the logic circuits control the offset voltages to change the operation mode.

Figure 12:
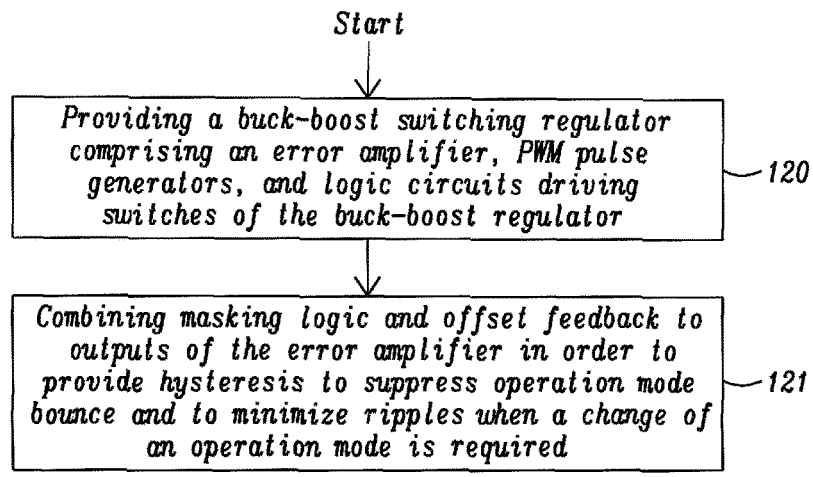
FIG. 12 shows a flowchart of a method combining masking logic and offset feedback to provide hysteresis to suppress mode bounce of a buck-boost regulator and have low ripple/glitch when a mode change is required.

FIG. 12 shows a flowchart of a method to suppress operation mode bounce of a buck-boost regulator and have low ripple/glitch when a mode change is required. A first step 120 depicts a provision of a buck-boost switching regulator comprising an error amplifier, PWM pulse generators, and logic circuits driving switches of the buck-boost regulator. The next step 121 shows combining masking logic applied to signals driving the switches of the switching regulator and offset feedback to outputs of the error amplifier in order to providing hysteresis to suppress operation mode bounce and to minimize ripples when a change of an operation mode is required.

While the invention has been particularly shown and described with reference to the preferred embodiments thereof, it will be understood by those skilled in the art that various changes in form and details may be made without departing from the spirit and scope of the invention.

The invention claimed is:

1. A method to suppress operation mode bounce of a buck-boost switching regulator and have low ripple/glitch when a mode change is required, the method comprising the steps of:
   (1) providing the buck-boost switching regulator, configured to operate in buck, buck-boost, or in boost operation mode, comprising an error amplifier, PWM pulse generators, logic circuits driving switches of the buck-boost regulator, a pulse masking block configured to mask pulses generated by the logic circuits and an offset voltage block, receiving input from the error amplifier and feedback from the pulse masking block and generating output to the PWM pulse generators; and
   (2) combining masking logic applied to signals driving the switches of the switching regulator and offset feedback from the pulse masking block to the offset voltage block wherein the offset feedback provides hysteresis in regard of a transition from buck mode to buck-boost mode or from buck-boost mode to buck mode or from buck-boost mode to boost mode or from boost mode to buck-boost mode to suppress operation mode bounce by staying in an actual mode as long as possible and to minimize ripples when a change of an operation mode is required, wherein boost pulses are masked by the pulse masking block while the buck-boost regulator is in buck mode and buck pulses are masked by the pulse masking block while the buck-boost regulator is in boost mode.

2. The method of claim 1, wherein for a transition from buck mode to buck-boost mode, error amplifier output voltages are shifted to higher values and for a boost mode to buck-boost mode transition, the error amplifier output voltages are shifted to lower values.

3. The method of claim 1, wherein a transition from buck mode to buck-boost mode is performed by masking a boost PWM pulse until buck PWM pulses are skipped in the buck mode.

4. The method of claim 1, wherein a transition from buck-boost mode to buck mode is performed by skipping boost PWM pulses.

5. The method of claim 1, wherein a transition from buck-boost mode to boost mode is performed by skipping buck PWM pulses.

6. The method of claim 1, wherein a transition from boost mode to buck-boost mode is performed by masking buck PWM pulses until boost PWM pulse are skipped in a buck mode.

7. A method to suppress operation mode bounce of a buck-boost regulator and have low ripple/glitch when a mode change is required, the method comprising the steps of:
   (1) providing a buck-boost switching regulator comprising an error amplifier, an offset voltage block receiving input from the error amplifier and feedback from a logic circuit block and generating output to PWM pulse generators, said PWM pulse generators, a pulse width checker, wherein the pulse width checker receives directly input from the PWM pulse generators and provides output to the logic circuit block, and said logic circuit block driving switches of the buck-boost regulator; and
   (2) combining state control of mode transition by directly monitoring pulse width of PWM pulses generated by PWM pulse generators by the pulse width checker and offset feedback from the logic circuit block to the offset voltage block in order to provide hysteresis to suppress operation mode bounce and to minimize ripples when a change of an operation mode is required, wherein the offset voltage added solely depends if the buck-boost converter is in buck mode, in buck-boost mode or in boost mode, wherein monitoring results are provided by the pulse-width checker to the logic circuits driving the switches, wherein hysteresis is provided for the mode transitions from buck mode to buck-boost mode or from buck-boost mode to buck mode or from buck-boost mode to boost mode or from boost mode to buck-boost mode, wherein the offset feedback added to the outputs of the error amplifier solely depends if the buck-boost converter is in buck mode, in buck-boost mode or in boost mode;
   wherein the pulse width checker defines transition points of change of operation modes, wherein when PWM pulse width crosses transition point, the mode change is triggered and the hysteresis can be implemented by having different pulse widths where the transition is triggered and once the mode change is triggered, the logic circuits control offset voltages to change the operation mode.

8. A buck-boost switching regulator configured to suppress operation mode bounce having low ripple/glitch when a operation mode change is required, wherein the buck-boost switching regulator is capable to perform transitions from buck mode to buck-boost mode or from buck-boost mode to buck mode or from buck-boost mode to boost mode or from boost mode to buck-boost mode, comprising:
   an error amplifier having inputs and an output, wherein a first input is an output voltage of the regulator, a second input is a reference voltage, and the output is an input of an offset voltage block;
   said offset voltage block enlarging an output voltage range of the error having an input and outputs wherein a first input is the output of error amplifier and a second input is an offset feedback from a pulse masking block and a first output is a first input to a first PWM pulse generator and a second output is a first input of a second PWM pulse generator, wherein the offset feedback provides hysteresis in regard of a transition from buck mode to buck-boost mode or from buck-boost mode to buck mode or from buck-boost mode to boost mode or from boost mode to buck-boost mode to suppress operation mode bounce by staying in an actual mode as long as possible and wherein the offset voltage added solely depends if the buck-boost converter is in buck mode, in buck-boost mode or in boost mode;
   the first PWM generator receiving ramp signals as second input and providing buck PWM signals to a logic circuit block;
   the second PWM generator receiving ramp signals as second input and providing boost PWM signals to the logic circuit block;
   said logic circuit block generating signals driving switches of the switching regulator providing output to a masking logic block; and said masking logic block configured to support operation mode transitions by masking PWM pulses and skipping PWM pulses in order to provide hysteresis in order to reduce a number of operation mode transitions, wherein hysteresis is provided in regard of transitions from buck mode to buck-boost mode or from buck-boost mode to buck mode or from buck-boost mode to boost mode or from boost mode to buck-boost mode, wherein boost pulses are masked by the pulse masking block while the buck-boost regulator is in buck mode and buck pulses are masked by the pulse masking block while the buck-boost regulator is in boost mode;

wherein the buck-boost switching regulator is capable of combining masking logic applied to signals driving the switches of the switching regulator and offset feedback to outputs of the error amplifier in order to provide hysteresis.

9. The buck-boost switching regulator of claim 8, wherein for a transition from buck mode to buck-boost mode error amplifier output voltages are shifted to higher values and for a boost mode to buck-boost mode transition the error amplifier output voltages, are shifted to lower values.

10. The buck-boost switching regulator of claim 8, wherein a transition from buck mode to buck-boost mode is performed by masking boost PWM pulse until buck PWM pulse are skipped in the buck mode.

11. The buck-boost switching regulator of claim 8, wherein a transition from buck-boost mode to buck mode is performed by skipping boost PWM pulses.

12. The buck-boost switching regulator of claim 8 wherein a transition from buck-boost mode to boost mode is performed by skipping buck pulses.

13. The buck-boost switching regulator of claim 8, wherein a transition from boost mode to buck-boost mode is performed by masking buck PWM pulses until boost PWM pulse are skipped in the buck mode.

14. A buck-boost switching regulator configured to suppress operation mode bounce having low ripple/glitch when a mode change is required, wherein the buck-boost switching regulator is capable to perform transitions from buck mode to buck-boost mode or from buck-boost mode to buck mode or from buck-boost mode to boost mode or from boost mode to buck-boost mode, comprising:

an error amplifier having inputs and an output, wherein a first input is an output voltage of the regulator, a second input is a reference voltage, and the output is afirst input of an offset voltage block;

said offset voltage block enlarging an output voltage range of the error amplifier having an input and outputs wherein a second input is a feedback offset voltage from a logic circuit block and a first output is a first input to a first PWM pulse generator and a second output is a first input of a second PWM pulse generator, wherein the offset feedback added to the outputs of the error amplifier solely depends if the buck-boost converter is in buck mode, in buck-boost mode or in boost mode;

the first PWM generator receiving ramp signals as second input and directly providing PWM signals to a pulse width checker and to the logic circuit block;

the second PWM generator receiving ramp signals as second input and directly providing PWM signals to a pulse width checker and to the logic circuit block;

said pulse width checker configured to perform state control by directly monitoring pulse width of the PWM pulses generated by said first and second PWM generators, wherein the output of the pulse width checker is an input of said logic circuit block; and said logic circuit block generating signals driving switches of the switching regulator and providing feedback offset voltage to the offset voltage block.

15. The buck-boost switching regulator of claim 14, wherein said pulse width checker is configured to define the transition points wherein when the PWM pulse width crosses the transition point, the mode change is triggered and wherein the hysteresis is implemented by having different pulse widths in order to trigger the transition is triggered and once the mode change is triggered, the logic circuits are configured to control the offset voltages to change the operation mode.

* * * * *